United States Patent
Valyi

[11] Patent Number: 5,941,054
[45] Date of Patent: Aug. 24, 1999

[54] METHOD FOR PRODUCING FILLED RIGID CONTAINERS OF PLASTIC

[75] Inventor: Emery I. Valyi, Katonah, N.Y.

[73] Assignee: The Elizabeth and Sandor Valyi Foundation, Inc., New York, N.Y.

[21] Appl. No.: 08/951,243

[22] Filed: Oct. 16, 1997

[51] Int. Cl.⁶ .................................................. B65B 47/00
[52] U.S. Cl. ............................. 53/453; 53/559; 53/561; 264/491
[58] Field of Search .............................. 53/453, 559, 141, 53/561, 452, 440; 264/523, 524, 525, 480, 491, 547, 479, 512, 515, 294

[56] References Cited

U.S. PATENT DOCUMENTS

| | | | |
|---|---|---|---|
| 2,900,665 | 8/1959 | Walker | 264/491 |
| 3,964,237 | 6/1976 | Johansen | 53/559 |
| 3,969,455 | 7/1976 | Moller | 53/453 |
| 4,040,233 | 8/1977 | Valyi | 53/440 |
| 4,327,052 | 4/1982 | Sauer | 264/523 |
| 4,342,183 | 8/1982 | Gordon | 53/453 |
| 4,539,172 | 9/1985 | Winchell | 53/453 |
| 4,543,770 | 10/1985 | Walter | 53/559 |
| 4,783,303 | 11/1988 | Imgram | 264/523 |
| 5,139,407 | 8/1992 | Kim | 264/491 |
| 5,290,490 | 3/1994 | Nied | 264/491 |
| 5,511,686 | 4/1996 | Gallay | 264/523 |
| 5,511,966 | 4/1996 | Matsui | 264/523 |
| 5,582,665 | 12/1996 | Elgen | 53/453 |
| 5,762,854 | 6/1998 | Valyi | 264/255 |

Primary Examiner—Peter Vo
Assistant Examiner—James P. Calve
Attorney, Agent, or Firm—Bachman & LaPointe, P.C.

[57] ABSTRACT

A method of preparing filled plastic containers by preparing a formed plastic precursor by thermoforming, pressure molding, or tabletting in a precursor preparation station, heating the plastic precursor in a heating station to a compression molding temperature, preparing a plastic preform by compression molding the heat plastic precursor in a preform production station, blow molding the preform into the configuration of a final container in a blow molding station, and filling the blow molded container in a filling station, wherein the preform preparation, blow molding and filling are performed sequentially in physically proximate operations.

5 Claims, 3 Drawing Sheets

METHOD FOR PRODUCING FILLED RIGID CONTAINERS OF PLASTIC

BACKGROUND OF THE INVENTION

In the process of producing a filled plastic container, for example, rigid plastic bottles of polyethylene terephthalate (PET), polypropylene or the like, the steps of producing the container are conventionally separated from the filling operation for many reasons. Production of the containers, as by injection blow molding or injection stretch blow molding, is typically and necessarily carried out at a different rate than the filling operation if both of these operations are to be performed at optimal efficiencies. The container molding operation, for example, is best performed without interruption, if major start-up losses are to be considered. This applies particularly to the process for injection molding of preforms which precedes the blowing operation. In fact, the injection molding procedure is primarily responsible for the disparity in the operating cycles.

It is well known in for example the milk carton technology to couple the forming of the containers with the filling processes. For example, for this operation a blank is conventionally supplied to a machine that sequentially erects the container, fills the container and seals the container. This procedure may be performed in adjacent and in-line sequential operations.

It would be highly desirable to provide a process for producing filled plastic containers which includes the preparation of these containers in a sequential and physically proximate operation.

Accordingly, it is the principal object of the present invention to provide a process for producing filled plastic containers including the preparation of these containers in a sequential and physically proximate operation without contaminating the substance that is filled thereinto.

Further objectives and advantages of the present invention will appear hereinbelow.

SUMMARY OF THE INVENTION

In accordance with the present invention, the foregoing objects and advantages are readily obtained.

The present invention provides a process for producing a filled plastic container, which comprises: preparing a plastic preform by compression molding in a preform production station; blow molding said preform into the configuration of a final container in a blow molding station; and filling said blow molded container in a filling station, wherein said preform preparation, blow molding and filling are performed sequentially in physically proximate operations, preferably under conditions whereby the substance to be contained therein is not contaminated.

In a preferred embodiment, the process of the present invention includes the step of preparing a precursor prior to preparing the preform and preparing the preform from the precursor. Desirably, the precursor is heated to compression molding temperature prior to preparation of the preform, said temperature being insufficient to cause substantial change in the morphology of the plastic. In addition, the process of the present invention preferably includes the step of maintaining the preforms at blow molding temperature in the compression molding step. Also, desirably the compression molding, blow molding and filling steps are simultaneously performed, preferably with the compression molding, blow molding and filling steps carried out at approximately the same rate.

BRIEF DESCRIPTION OF THE DRAWINGS

The present invention will be more readily understood from a consideration of the accompanying illustrative drawings, wherein.

DETAILED DESCRIPTION OF PREFERRED EMBODIMENTS

Figure 1:
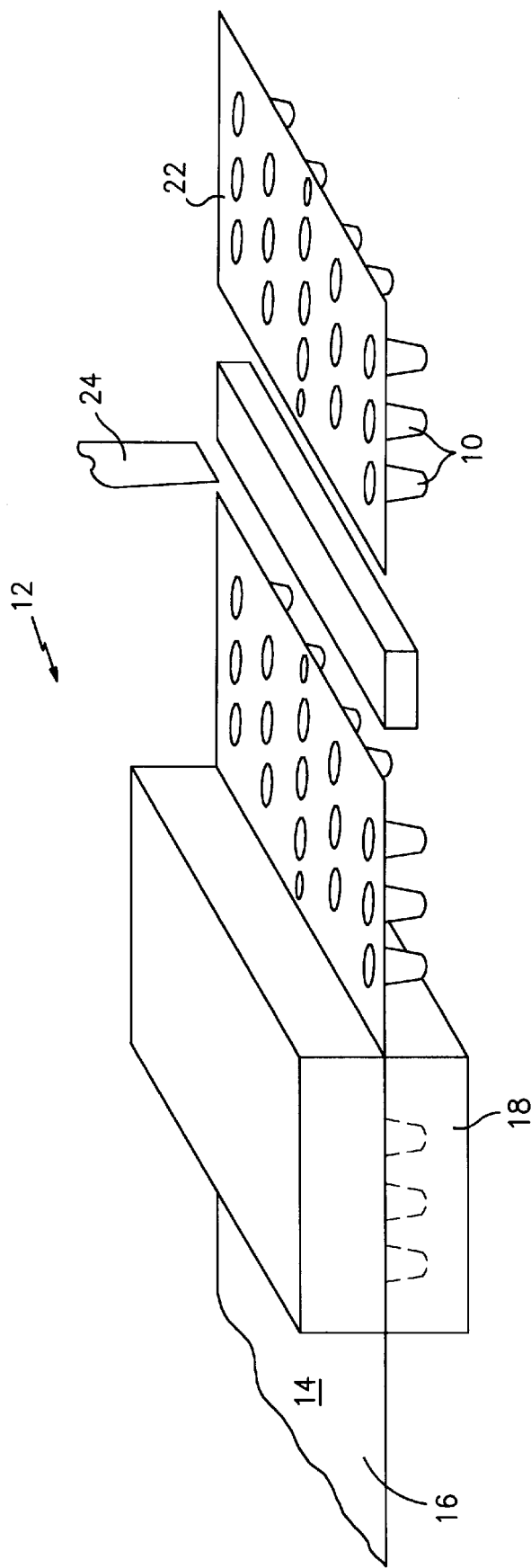
FIG. 1 is a partly schematic view of a thermoforming process which may be used for forming thermoplastic precursors in accordance with the present invention.

It is a particular advantage of the present invention that means are provided to perform every operation required to produce the container at the same rate and mold cavity cycle and to fill the containers at a rate that is an even multiple of the output of a single cavity mold set, said set typically consisting of a preform mold and a finishing blow mold. This is accomplished in accordance with the present invention by producing the preform by compression molding instead of injection molding, and by performing the sequential operations of preform preparation by compression molding, blow molding the preform into the final container form and filling the blow molded container in a filling station.

As is commonly known, injection molding requires that the plastic be melted, i.e., heated to a high enough temperature to enable the plastic to flow through the channels of a hot runner system and through injection nozzles followed by injection gates, and finally into chilled mold cavities. The rates for accomplishing this and the pressures for accomplishing this must permit the cavities to be filled completely without the chilled walls of the cavities inhibiting sufficient flow. When the plastic is thus heated, the molecular structure of the plastic changes due to thermal degradation. The result of this is that the plastic has changed and usually decreased in quality. In addition, this procedure is accompanied by the generation of volatile degradation products which are undesirable. Thus, conventionally one carries out the injection molding of the preforms at a location different from the filling operation and therefore does not perform the container preparation sequentially and in physically proximate operations with the filling operation. Many if not most beverages and some food products absorb the volatile degradation products described above, with the effect that even small quantities of these degradation products influence taste and odor unfavorably. Even small quantities of these volatile degradation products are sufficient to do a considerable amount of damage.

Therefore, as indicated above, the direct coupling of the filling and rigid container production procedures is insufficiently effective with the current state of the art. Some reasons for this include the fact that the rate of filling is very difficult, if at all possible, to match with the rate of the several steps of container forming. In addition, as indicated hereinabove, container forming by injection blow molding or injection stretch blow molding causes degradation of the plastics which necessitates the use of expensive materials that provide the required properties of the container after their degradation. This is economically undesirable. In addition, degradation of the commonly used plastics is accompanied by the generation of volatile degradation products that may be harmful to the substance being filled into the containers. This precludes the physically proximate placement of the steps of rigid container production that cause such degradation at the filling line, resulting in a more expensive and inconvenient process.

In accordance with the present invention, one readily produces filled plastic containers in-line and sequentially with the preparation of rigid plastic containers.

FIG. 1 illustrates a procedure for producing a precursor to a preform in a first station in the sequence of stations. The precursor preparation station need not be adjacent to the subsequent stations. Instead, it may be located next to the facility that produces the plastic, depending on applicable economics.

As shown in FIG. 1, precursors 10 are thermoformed in step 12. Thus, a sheet 14 of thermoplastic material 16, which may for example be PET or polypropylene, which may have two, three or more layers of different materials to provide a multi-layered material, is supplied to thermoforming means 18. A plurality of thermoformed precursors 10 are formed in the thermoforming means 18 from thermoplastic material 16 in sheet 22 which is severed by conventional trim-cutting means 24. The precursors may also be made by other means, as by pressure molding or tabletting, in known ways. In tabletting, one makes tablets by compressing particulate material, which is a well known technology.

Figure 2:
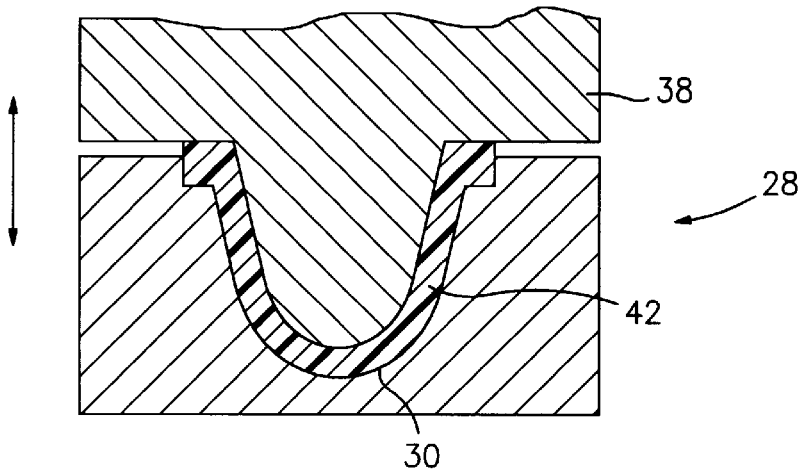
FIG. 2 is a partly schematic sectional view of one embodiment of the step of preparing the preform from the precursor by compression molding.

FIG. 2 shows a second station for preparing a preform from the precursor by compression molding, which as indicated hereinabove, is physically independent of the precursor preparation station.

Prior to preparation of the preform, the precursor is desirably heated to compression molding temperature by known heating means (not shown), to a temperature that does not cause degradation of the plastic or the release of volatile degradation products. The heating means are preferably provided by radio-frequency current (RF heater), which is particularly efficient, but it may also be a convection, radiation, or fluidized bed heater.

As shown in FIG. 2, compression molding assembly 28 is provided, which is desirably openable as indicated by the arrow, and having a cavity 30 therein in the desired preform shape, including threaded neck portion if desired (not shown). The precursor 10 may have two or more layers. RF heating is preferred, particular for thick-walled precursors, because it does not rely on the heat conductivity of the plastic, which is poor. As shown in FIG. 2, mold core 38 is inserted into the cavity of the heated precursor 10, as placed into cavity 30, to compression mold preform 42. The shown preform 42 is representative only and naturally any suitable shape may be produced.

Compression molding, being a process carried out in the solid state, may be performed within the temperature range of blow molding. Accordingly, the precursor is in condition to be moved by conventional means directly to blow molding, preferably at constant temperature.

Figure 3:
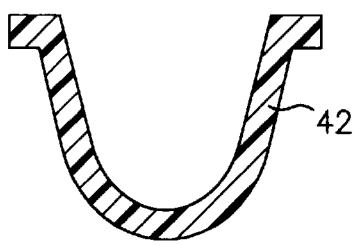
FIG. 3 is an elevational view of the preform prepared in FIG. 2.
Figure 4:
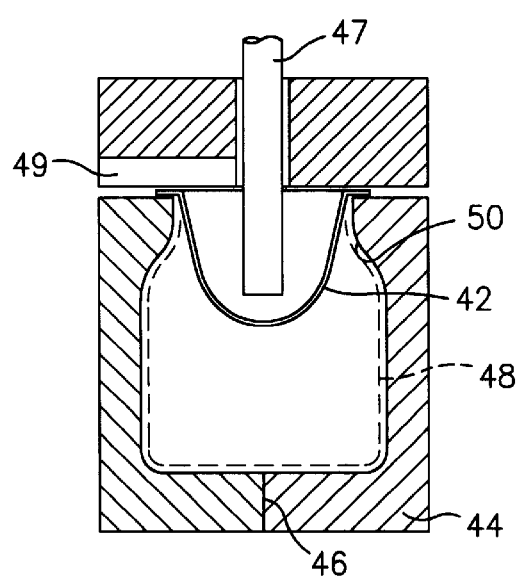
FIG. 4 is a partly schematic view of the blow molding step.

Thus, the precursors may be heated in a separate heating station to compression molding temperature as indicated above, transported from the heating station to the compression molding station as shown in FIG. 2, and therein reshaped into preforms, as preforms 42 shown in FIG. 3. The components of the compression mold in FIG. 2 are preferably held at a temperature Which is not lower than the temperature at which the next step is performed, i.e., the blow molding step as shown in FIG. 4. The compression molding step shown in FIG. 2 may be adjusted to be an even multiple of the filling step. Hence, a number of compression molds may be assembled for conformance with the rate of filling. The blow molding step is shorter than the compression molding step.

Following compression molding of the preform in FIG. 2, the preform 42 is transferred to the blow molding station, shown in FIG. 4, adjacent and desirably in-line with the compression molding station. Thus preform 42 is transferred to blow mold 44, which may be separable along parting line 46 and which may include stretch rod 47, and expanded into the shape shown by dashed line 48, into conformance with the blow mold cavity 50, by means well known, as by blowing air through channel 49. The operating cycle of the blow molding station shown in FIG. 4 is typically shorter than that of the compression molding cycle shown in FIG. 2. Thus, if these operations are performed sequentially, in adjacent or physically proximate operations, preform production, blow molding and filling can in fact be carried out at the same rate, and each operating station is capable of economic operation at the same rate as the other to provide an efficient and highly desirable in-line system.

Figure 5:
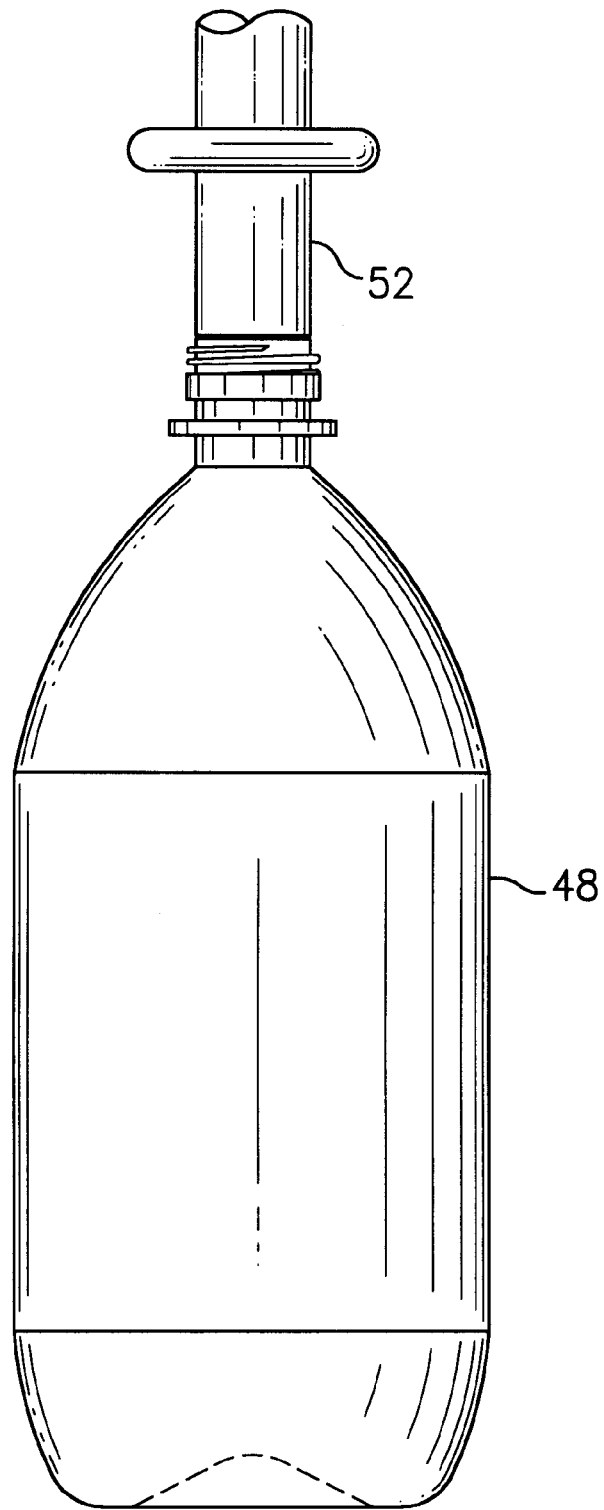
FIG. 5 is a side view of the filling step.

The blow molding operation shown in FIG. 4 is followed by a filling operation shown in FIG. 5 wherein filling head 52 is applied to container 48 to fill same in a simple manner at a physically proximate location with the blow molding and preform preparation steps. This may be followed by other operations, e.g., inspection, packaging, etc. in one or more of following operations which desirably may be in a location physically proximate with the filling operation.

If the filling operation needs to be interrupted, the entire sequence may also be conveniently interrupted without loss of any material or shutdown penalty, and then restarted when the filling operation is restarted. Due to the low temperatures at which all of the molding steps are carried out, no degradation of the plastic occurs and hence no volatile degradation products. Therefore, the plastic introduced into the process may be of substantially the same molecular weight as that desired for the finished container. Also, a highly advantageous sequential operation is provided where the preform preparation, blow molding and filling steps are performed sequentially in physically proximate operations. This results in a highly advantageous and economical procedure.

It is to be understood that the invention is not limited to the illustrations described and shown herein, which are deemed to be merely illustrative of the best modes of carrying out the invention, and which are susceptible of modifications of form, size, arrangement of parts and details of operation. The invention rather is intended to encompass all such modifications which are within its spirit and scope as defined by the claims.

What is claimed is:

1. Process for the preparation of a filled plastic container, which comprises: preparing a formed plastic precursor having a cavity therein by one of thermoforming, pressure molding and tabletting in a separate precursor preparation station; heating the precursor plastic in a heating station to a compression molding temperature that is insufficient to cause a substantial change in the morphology of the plastic; preparing a plastic preform from said heated plastic precursor by compression molding said heated plastic precursor in a preform production station while substantially maintaining the plastic preform at a blow molding temperature; blow molding said preform into the configuration of a final container in a blow molding station; and filling the blow molded final container in a filling station, wherein said preform preparation, blow molding and filling are performed sequentially in physically proximate operations.

2. Process according to claim 1, wherein the precursor is heated to compression molding temperature by radio frequency heating.

3. Process according to claim 1, wherein said compression molding, blow molding and filling steps are carried out at approximately the same rate.

4. Process according to claim 1, wherein said blow molded container is filled with a substance and wherein said filling is performed under conditions whereby said substance is not contaminated.

5. Process according to claim 1, wherein said blow molded container is filled with a rate of filling, and wherein said compression molding step includes assembling a number of compression molds for conformance with said rate of filling.

* * * * *